(12) United States Patent
Bibollet

(10) Patent No.: US 6,416,065 B1
(45) Date of Patent: Jul. 9, 2002

(54) SLIDING VEHICLE FOR SNOW SPORT

(76) Inventor: Jean-Claude Bibollet, Le Glapigny, BP 1, F-74230 Thones (FR)

( * ) Notice: Subject to any disclaimer, the term of this patent is extended or adjusted under 35 U.S.C. 154(b) by 0 days.

(21) Appl. No.: 09/657,323

(22) Filed: Sep. 7, 2000

(51) Int. Cl.$^7$ ............................................. B62B 13/00
(52) U.S. Cl. ..................................... 280/28.14; 280/20
(58) Field of Search ................................ 280/14.1, 845, 280/20, 19.1, 15, 21.1, 22, 22.1, 16, 603, 18, 28.11, 28.14, 25, 11.16, 609

(56) References Cited

U.S. PATENT DOCUMENTS

| | | | | |
|---|---|---|---|---|
| 1,672,782 A | * | 6/1928 | Ring | 280/28.14 |
| 2,062,953 A | * | 12/1936 | Wargo | 280/28.14 |
| 3,014,731 A | * | 12/1961 | Dworak | 280/16 |
| 3,560,012 A | * | 2/1971 | Auer | 280/16 |
| 3,561,783 A | * | 2/1971 | Ellett | 280/16 |
| 3,825,360 A | * | 7/1974 | Galich | |
| 3,897,078 A | * | 7/1975 | Melnick et al. | 280/15 |
| 3,917,301 A | * | 11/1975 | Fabris | 280/25 X |
| 4,324,409 A | * | 4/1982 | Larsen et al. | 280/14.1 |
| 5,244,227 A | * | 9/1993 | LaCroix | 280/609 X |
| 5,275,428 A | * | 1/1994 | Bejean | 280/609 X |
| 5,348,322 A | * | 9/1994 | Rauf et al. | 280/18 |
| 5,516,126 A | | 5/1996 | Myers | |
| 5,667,238 A | * | 9/1997 | Sarver | 280/609 X |
| 5,673,772 A | * | 10/1997 | Martin | 280/28.11 X |
| 6,019,380 A | * | 2/2000 | Goodman et al. | 280/14.1 X |
| 6,036,202 A | * | 3/2000 | LcCome | 280/25 X |
| 6,179,305 B1 | * | 1/2001 | Capozzi et al. | 280/14.1 X |

FOREIGN PATENT DOCUMENTS

| | | | |
|---|---|---|---|
| AT | 42200 | * | 5/1910 |
| CH | 487752 | * | 5/1970 |
| DE | 2017827 | * | 10/1971 |
| DE | 2257233 | * | 5/1974 |
| DE | 3513138 | * | 10/1986 |
| DE | 2592806 | * | 7/1987 |
| DE | 297 11 581 U 1 | | 8/1997 |
| EP | 0 149 953 A | | 7/1985 |
| EP | 0 940 160 A | | 9/1999 |
| FR | 2611515 | * | 9/1988 |

OTHER PUBLICATIONS

L. Billet Et V. Feltin: Mecanique Industrielle Et Materiauz, vol. 49, No. 4, Dec. 1996, pp. 171–173, XP000694630 p. 171; figure 1.

* cited by examiner

Primary Examiner—Paul N. Dickson
Assistant Examiner—Bryan Fischmann
(74) Attorney, Agent, or Firm—Oliff & Berridge, PLC

(57) ABSTRACT

A sliding vehicle for snow sport includes a sliding pad bearing on the snow, a support element provided with a seat in the central portion and a conducting member in the front portion. The support element may be articulated at the rear portion of the pad around a transverse axis extending perpendicularly with respect to the longitudinal direction, and is connected to the front of the pad by a mechanical connection, allowing the support element to be turned down against the pad in the putting away and transportation position. A shock absorbing member may be added to the mechanical connection in order to absorb the shocks received by the pad during the sliding phase.

21 Claims, 10 Drawing Sheets

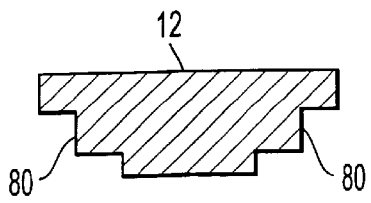
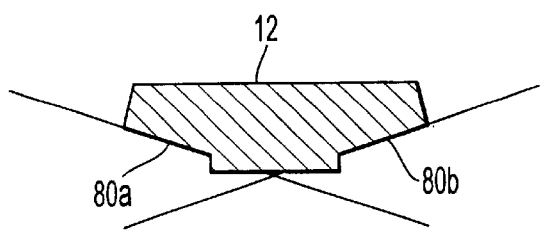
FIG. 10
FIG. 11
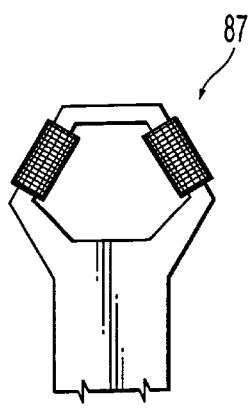
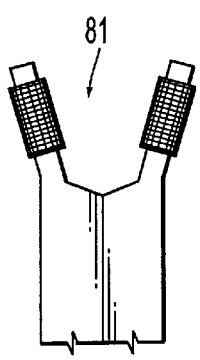
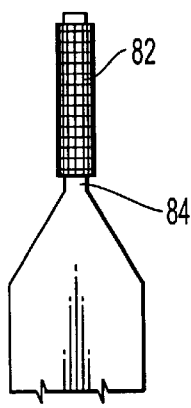
FIG. 12
FIG. 13
FIG. 14
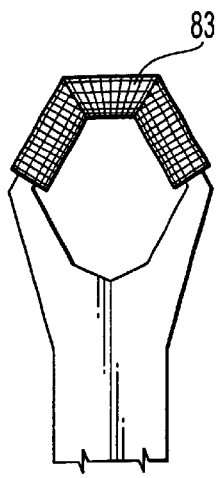
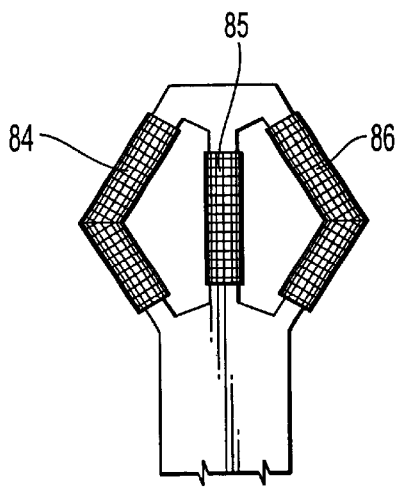
FIG. 15
FIG. 16

SLIDING VEHICLE FOR SNOW SPORT

BACKGROUND OF THE INVENTION

The invention relates to a sliding vehicle for snow sport, comprising:
- a sliding pad bearing on the snow,
- a support element provided with a seat on which the driver sits down,
- and a manual conducting member for the steering and braking control of the vehicle, said member being connected with the support element and formed at least by a handle or handlebar, located between the legs of the pilot in front on the seat and in the sliding direction.

DESCRIPTION OF THE PRIOR ART

Such an apparatus is well known under the name "PARET", and is realized entirely of wood in assembling by mortise and tenon joint the seat and the handle on the pad. In the normal conducting position, the single pad slides on the snow, and it is sufficient to exert a tractive effort on the handle to raise the front portion of the pad, provoking a brake effect on the rear portion. The monoblock structure of this apparatus presents an important bulk and weight, which do not make easy its transportation. Another disadvantage is the absence of any shock absorbing effect in case of shocks received during the downhill trip.

The document FR-A-2000762 relates to a sleigh, comprising a seat in the form of a basin directly in contact with the snow, and a steer lever protruding to the top. Such an apparatus is however difficult to steer because the relatively small height of the seat with regard to the bottom and the relatively large width of the pad, do not allow the pilot to incline the apparatus in order to change the direction. Steering is accomplished in the manner of a classic sled; i.e., braking with a foot at the inside of the curve.

The document WO95/15504 describes an apparatus that allows a leg handicapped skier to practice downhill skiing. The apparatus comprises a sole connected to a classic downhill ski and a support arm of a seat, which is articulated at the front portion to a swinging axis. The balance and the steering are executed with the arms of the skier, a small ski being mounted at the end of each stick, and bearing on the ski run according to a predetermined orientation in the curves. A telescopic shock absorbing spring allows it to absorb the mechanical shocks when practicing skiing. Such a device is very heavy and is not suited to be transported easily by the skier.

The document CH-A-537198 describes a ski-bob provided with two skis connected with the frame through two articulated arms and through shock absorbers with elastic deformation.

BRIEF DESCRIPTION OF THE DRAWINGS

Further advantages and characteristics will become apparent from the following description of different embodiments of the invention, given as example only and represented in the accompanying drawings, in which:

FIG. 10 is a transverse cross sectional view of the sliding pad;

FIG. 11 is a transverse cross sectional view of a sliding pad with a different pad profile than that shown in FIG. 10;

FIGS. 12 to 16 show different embodiments of the conducting member;

DESCRIPTION OF THE PREFERRED EMBODIMENT OF THE INVENTION

Figure 1:
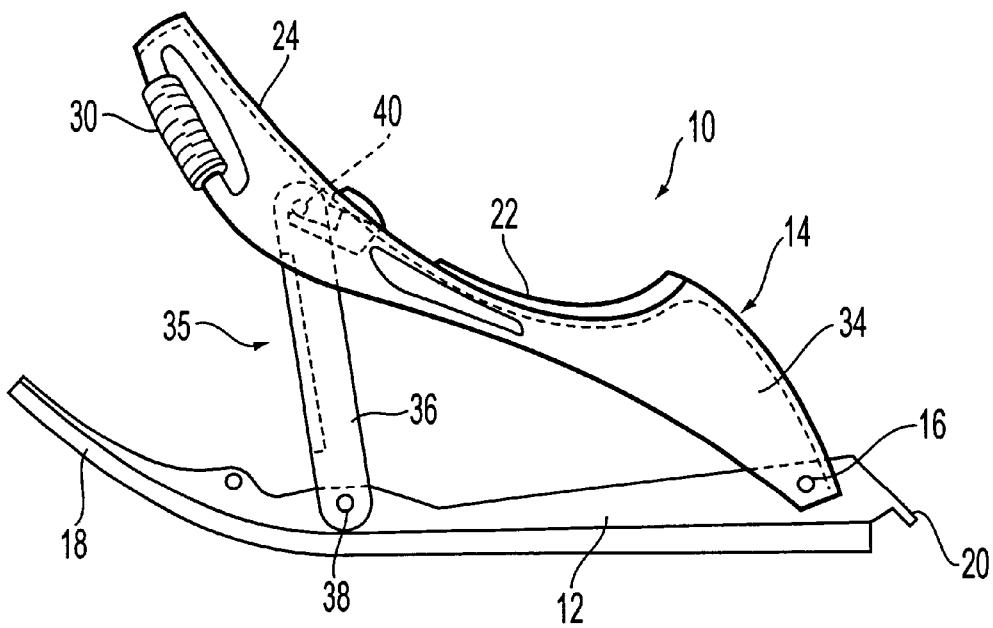
FIG. 1 is a schematic view of a sliding vehicle according to the invention, represented in the active using position.
Figure 2:
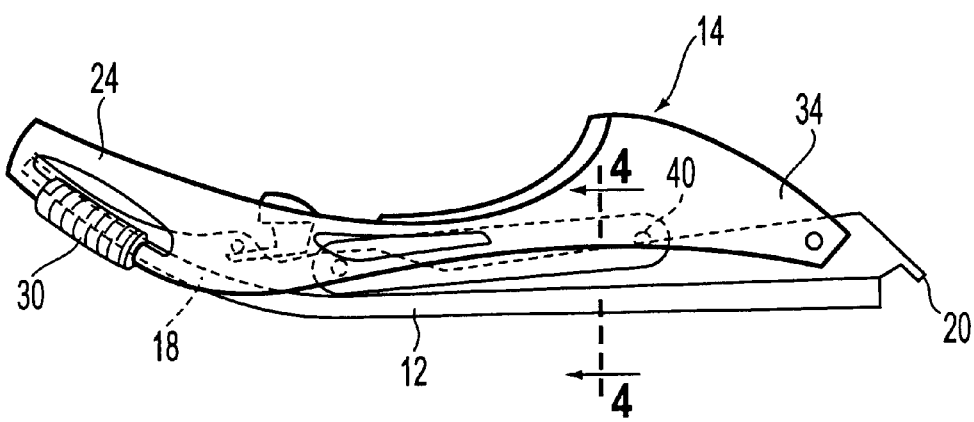
FIG. 2 is a view of the vehicle of FIG. 1, after folding towards the inactive put away position.
Figure 3:
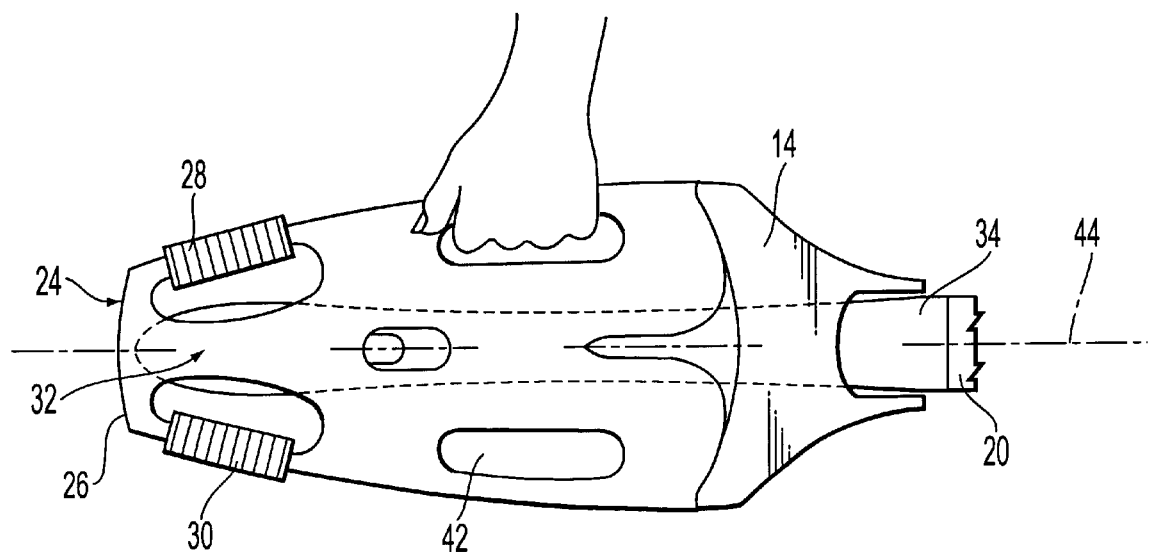
FIG. 3 shows a view of FIG. 2, illustrating a manner of transporting the vehicle in its inactive position.

With reference to FIGS. 1 to 4, a sliding vehicle 10 for snow sport comprises a single sliding pad 12 bearing on the snow, and a support element 14 articulated on the sliding pad 12 around a transverse axis 16 extending perpendicularly to the longitudinal direction. The pad 12 has a short ski form with a width greater than 5 cm and a length smaller than 140 cm.

The front portion of the pad 12 forms a tip 18 raised upwards in the sliding direction, whereas the rear portion is provided with a braking member 20 which can brake the vehicle 10 when it is going downhill after a manual order.

The intermediate portion of the support element 14 is performed as a seat 22, which is extended to the front by a conducting member 24 arranged between the legs of the user when he is sitting on the seat 22. The conducting member 24 comprises for example a handlebar 26 with two gripping handles 28, 30 (FIG. 3) separated one from the other by a central branch 32. The base 34 of the support element 14 is pivotably mounted on the transverse axis 16 at the rear portion of the pad 12.

The front of the support element 14 is connected to the pad 12 by a mechanical connection 35 comprising a connection rod 36 articulated on an axis 38, of the pad 12, and comprising an disconnectable end 40 which can be disconnected from the support element 14. In the active position (FIG. 1), the disconnectable end 40 of the rod 36 is locked in order to constitute a rigid spreading connection, through which the support element 14 is shifted with respect to the pad 12 by an acute angle.

In the inactive position (FIG. 2), the bulk of the vehicle 10 can be reduced to a minimum after preliminary unlocking of the end 40 from the connection rod 36, followed by its arranging on the pad 12 after pivoting around the axis 38 in the clockwise direction. It is sufficient to turn down then in the opposite direction around the axis 16 the support element 14 towards a lowered position, bearing steadily on the tip 18.

The intermediate portion of the support element 14 is provided with at least one opening 42 which is shifted laterally from the longitudinal axis 44 in order to constitute a gripping handle which makes the transportation in the folded inactive position (FIG. 3) easier.

Figure 4:
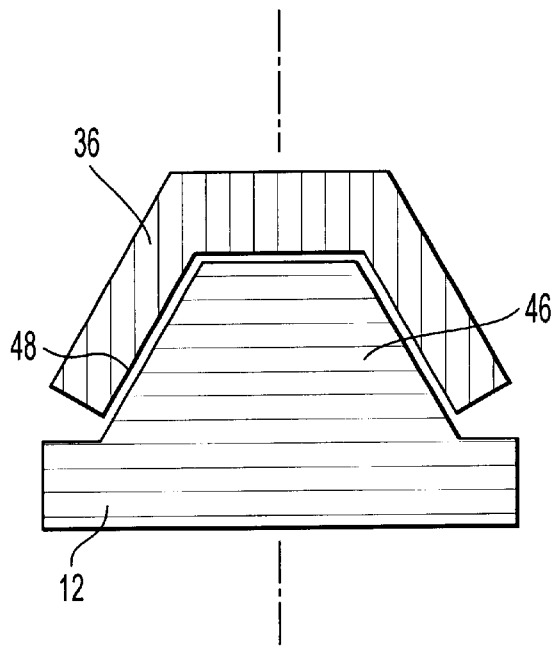
FIG. 4 represents a cross sectional view according the line 4—4 of FIG. 2.

On FIG. 4, the intermediate portion of pad 12 comprises a bump 46 of approximately trapezoidal section, cooperating with a hollow 48 of conjugated form of the rod 36 during its arranging on pad 12.

Figure 5:
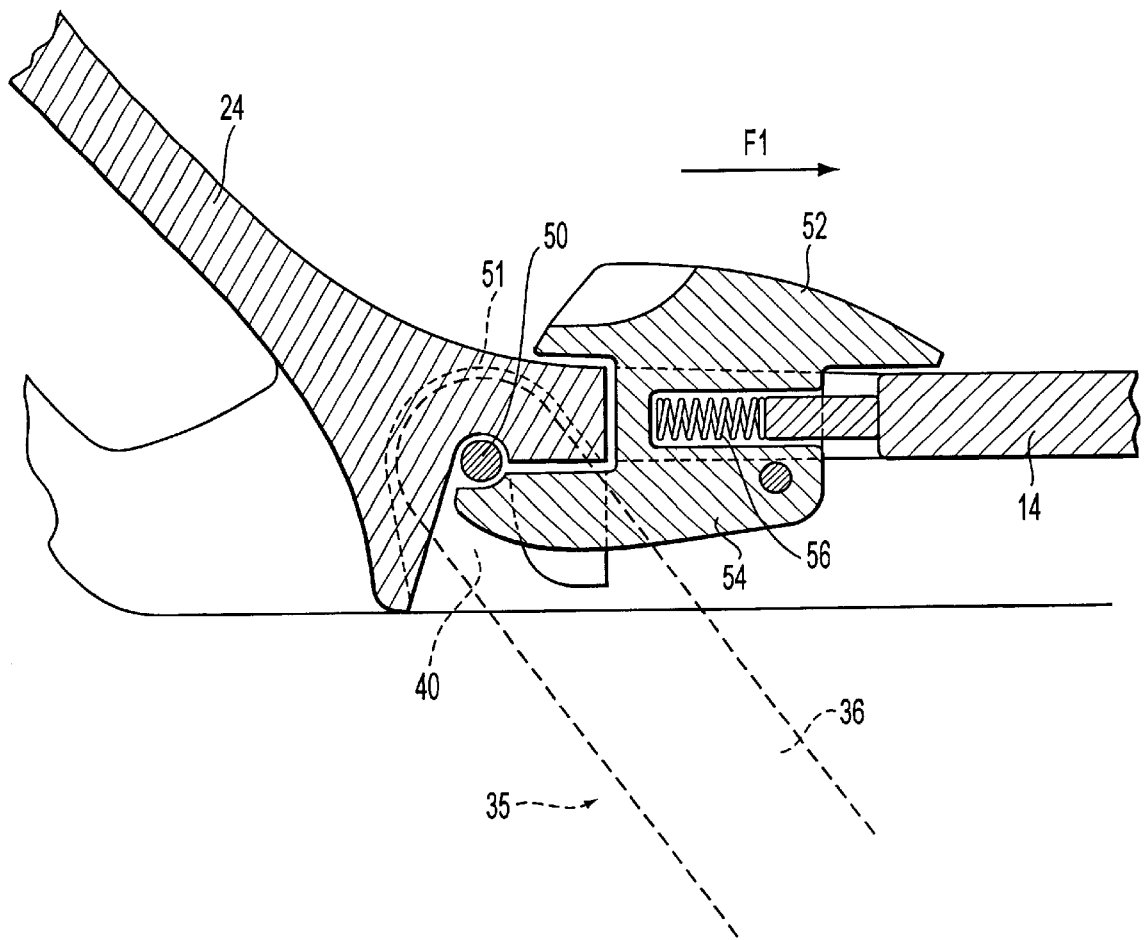
FIG. 5 shows a cross sectional detail view on enlarged scale, of the hanging up of the mechanical connection on the support element.

With reference to FIG. 5, the disconnectable end 40 of the connection rod 36 of FIG. 1, comprises an axis 50 held on the bottom of a U-shaped slot 51 of the support element 14 by means of a telescopic bolt 52. The telescopic bolt 52 is provided with a retaining arm 54 preventing the release of the axis 50, and with an internal spring 56 brining the telescopic bolt 52 towards the locked position in the connection area of the front of seat 22 with the conducting member 24. The manual movement of the telescopic bolt 52 in direction of the arrow F1 against the return force of the spring 56 causes the withdrawal of the arm 54 and the release of axis 50. Then it is possible to fold the rod 36 and to bring the support element 14 back into the inactive position illustrated in FIG. 2.

Figure 6:
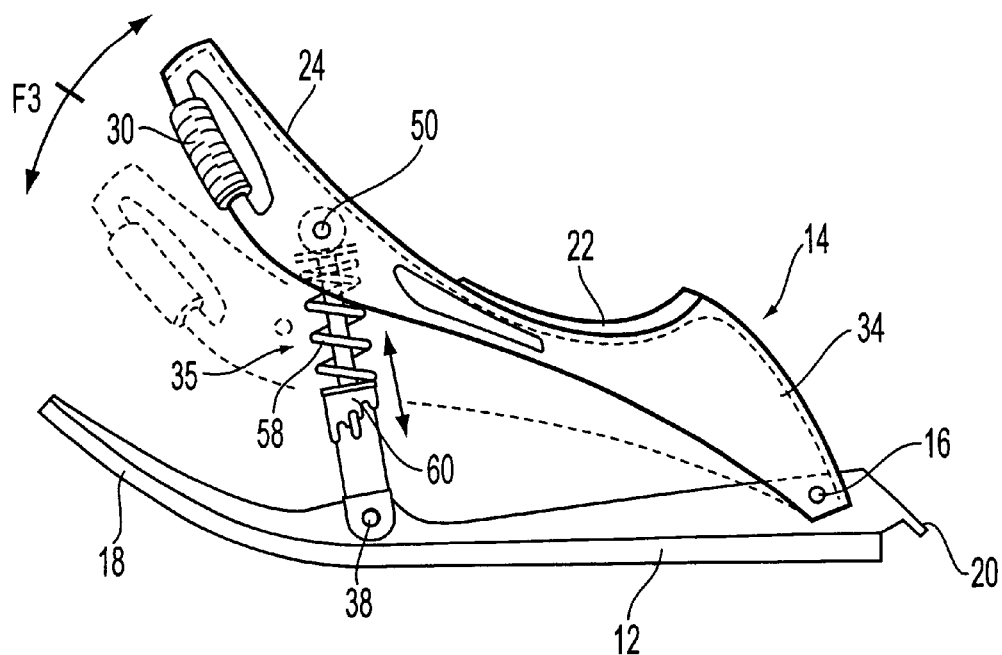
FIGS. 6 and 7 show another embodiment of a vehicle with shock a absorber, respectively in active and inactive position.

On FIG. 6, the connection rod 36 is associated to a shock absorbing member 58 allowing a limited flexion of the support element 14 (arrow F3) depending on the weight of the pilot and on the mechanical shocks received by the vehicle 10 going downhill. The shock absorbing member 58 is for example constituted by a metallic compression spring or a combination spring-shock absorber, the preconstraint of which is advantageously adjustable by means of a manual adjustment device 60, for example using a rack and pinion or cam stop. Any other suspension member can be used, particularly a deformable buffer of rubber or elastomer or an oil pneumatic or,hydraulic shock absorber.

Figure 7:
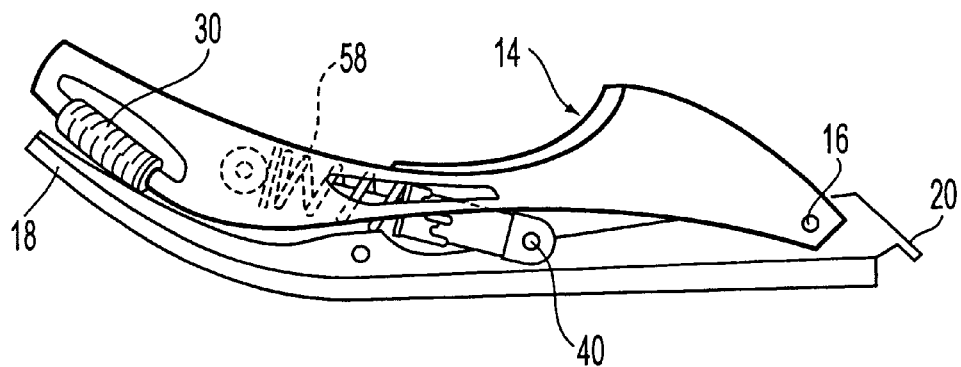

On FIG. 7, the disconnectable end 40 of the shock absorbing member 58 is disconnected from the support element 14 in order to allow the folding and arrangement of the whole towards the inactive position.

Figure 8:
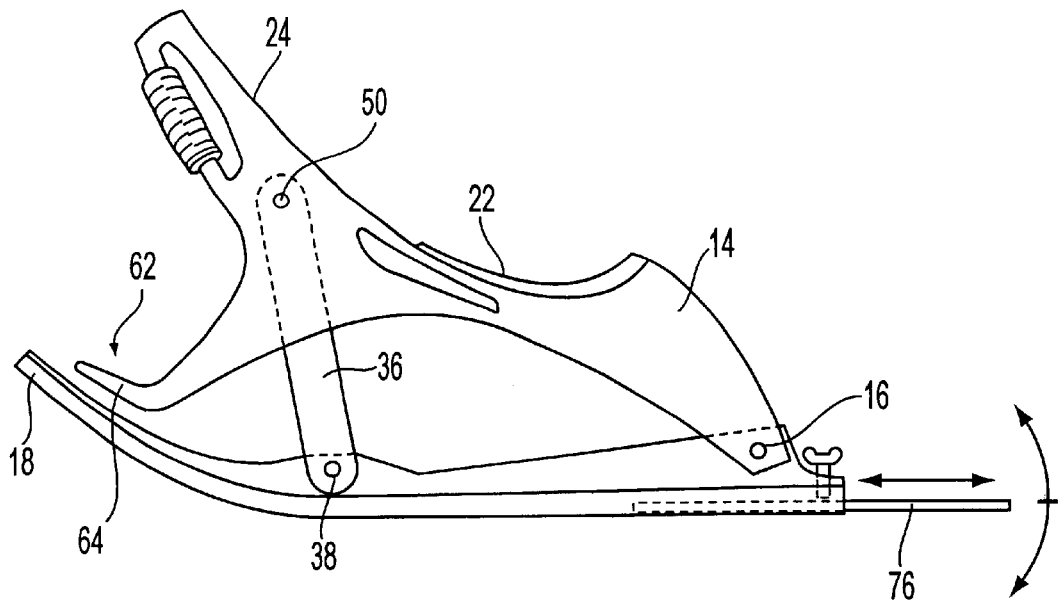
FIGS. 8 and 9 represent two further embodiments of vehicles provided each with a stationary footrest.
Figure 9:
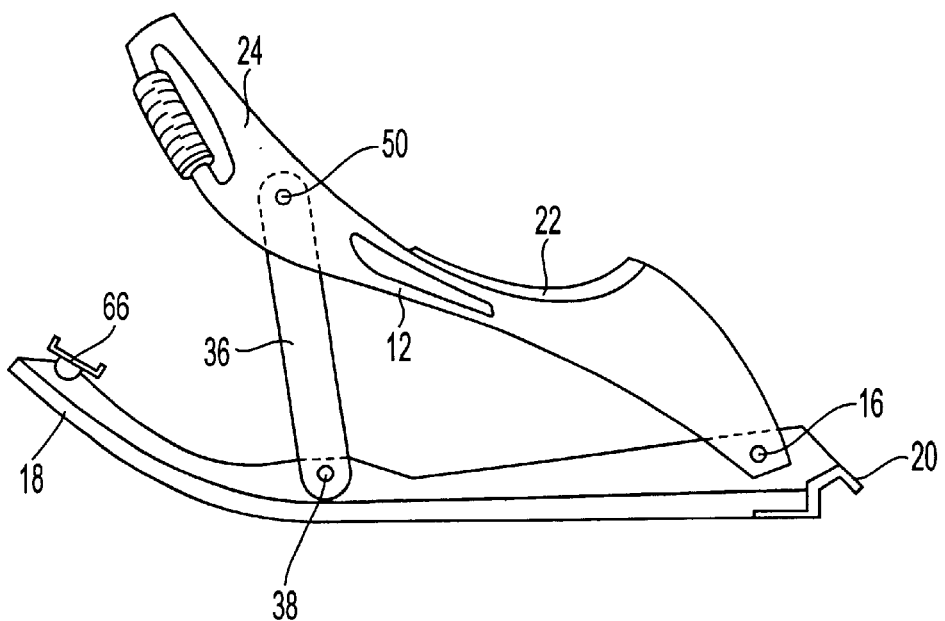

With reference to FIGS. 8 and 9, the vehicle 10 can be provided further with a footrest device 62 mounted at the front of the mechanical connection. The footrest device 62 is constituted by a front extension 64 of the support element 14 (FIG. 8), or by a transverse bar 66 connected with the tip 18 (FIG. 9). The extension 64 or the bar 66 of the stationary footrest device 62 is arranged in the front area under the level of the seat 22 and over the sliding pad 12.

The sliding surface of the pad 12 on the snow can be flat or comprise areas slightly concave or convex. Metallic edges may be placed on a portion of at least the length of the lateral sides of the sliding surface. The rear portion comprises advantageously a metallic sole extending on the whole width of the pad 12 and ending by a scraper of the braking member 20. The main part of the pad 12 and of the support element 14 is made of wood, of molded plastic material or of composite material or metal alloy.

On FIG. 10, the sliding surface 80 of the pad 12 is subdivided in a plurality of support surfaces terrace shifted in the vertical direction in order to adjust the sinking of the vehicle according the snow conditions. The lateral edges of the sliding pad 12 can be straight and parallel to the longitudinal axis, or of slightly concave or convex forms in the intermediate portion. According to FIG. 11, the terraces are replaced by oblique support surfaces 80a, 80b making an obtuse angle between them in two cutting plans forming a dihedral open to the top.

The conducting member 24 may be shaped according to other embodiments. On FIG. 12, the conducting member corresponds to the handlebar of FIG. 3, but without the central branch. On FIG. 13, the handlebar constitutes an open loop in the form of a fork 81 arranged symmetrically with regard to the longitudinal median plan. On FIGS. 14 and 15, a single handle 82, 83 is located respectively on the upper vertical or horizontal branch.

On FIG. 16, the conducting member 24 comprises three branches with handles 84, 85, 86.

Figures 17, 18:
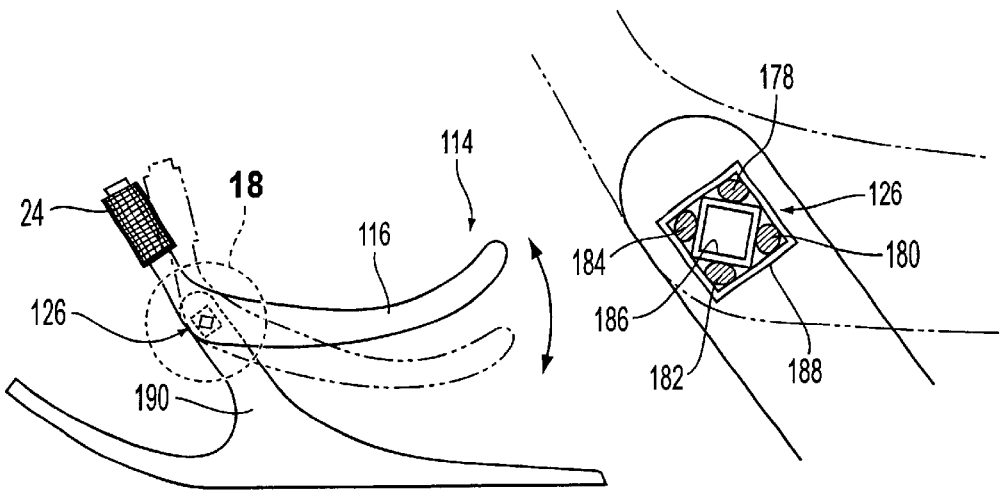
FIGS. 17 to 20 are schematic views of three further embodiments of the suspension of the vehicle.

With reference to FIGS. 17 and 18, the seat 116 is mounted with limited pivoting on the connection leg 190 by means of an elastic connection formed of at least a torsion joint 126 causing the automatic return of the support element 114 towards the initial position (in big lines on FIG. 17). The support element 114 is cantilevered on the front portion of the pad 112, and the joint 126 extends transversely with regard to the longitudinal direction of pad 112. The joint 126 comprises a plurality of prestressed rubber blocks 178, 180, 182, 184 arranged between the four faces of a first square tube 186 and the four angles of a second square tube 188, the first tube 186 being arranged in a concentric manner inside the second tube 188.

Figure 19:
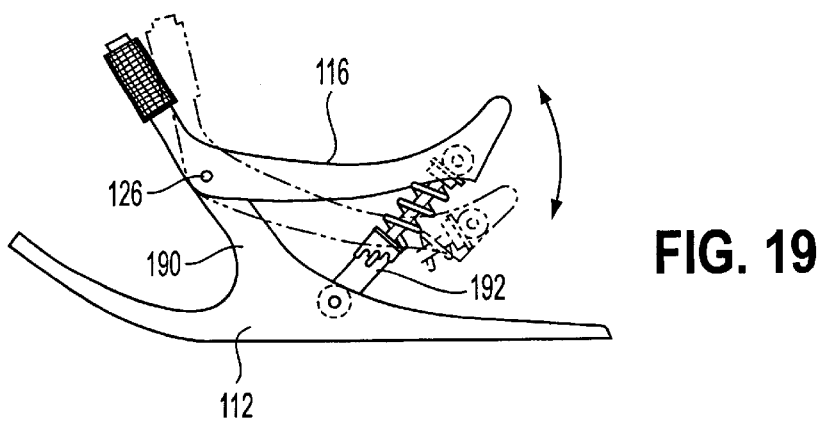

On FIG. 19, an additional shock absorbing member 192 is advantageously articulated between the median portion of pad 112 and the rear portion of the support element 114 forming a V with the leg 190.

Figure 20:
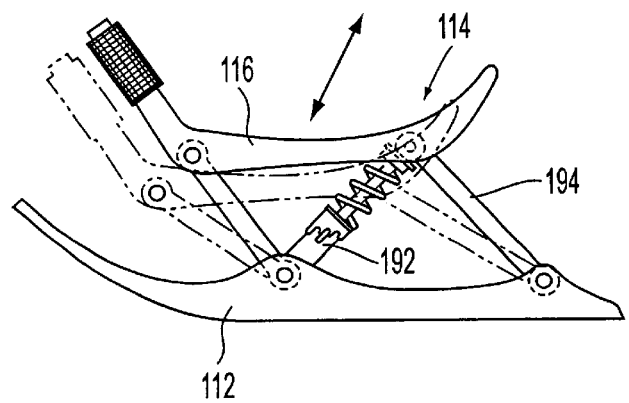
Figure 21:
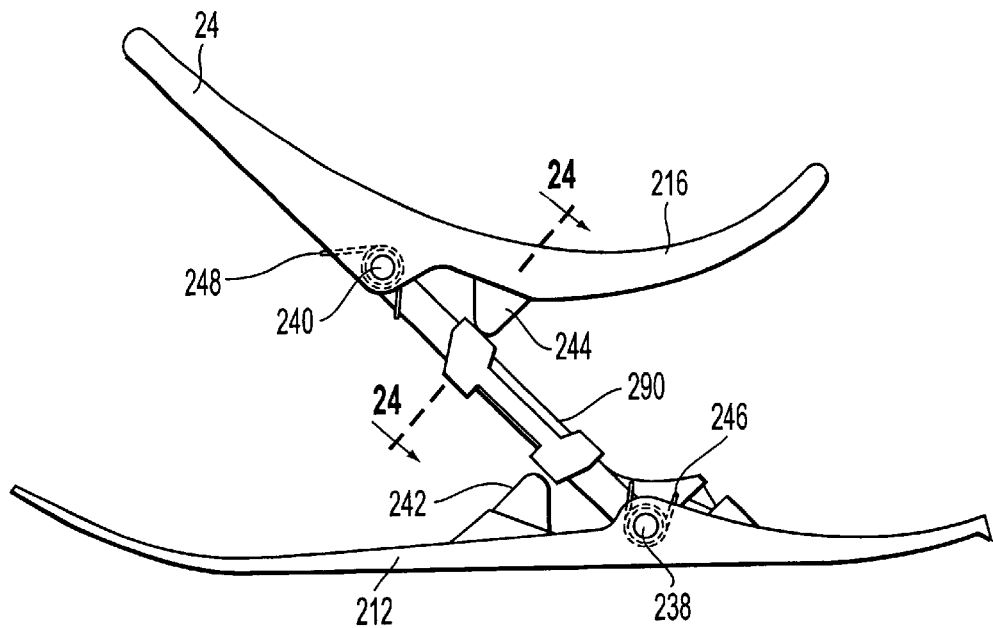
FIGS. 21 to 23 show another embodiment of the suspension of a vehicle, respectively in raised position, in intermediate position and in folded position.

On FIG. 20, a rod 194 is articulated at the rear portion of the support element 114 and of the pad 112 extending parallelly to the connection rod 191.

Figure 22:
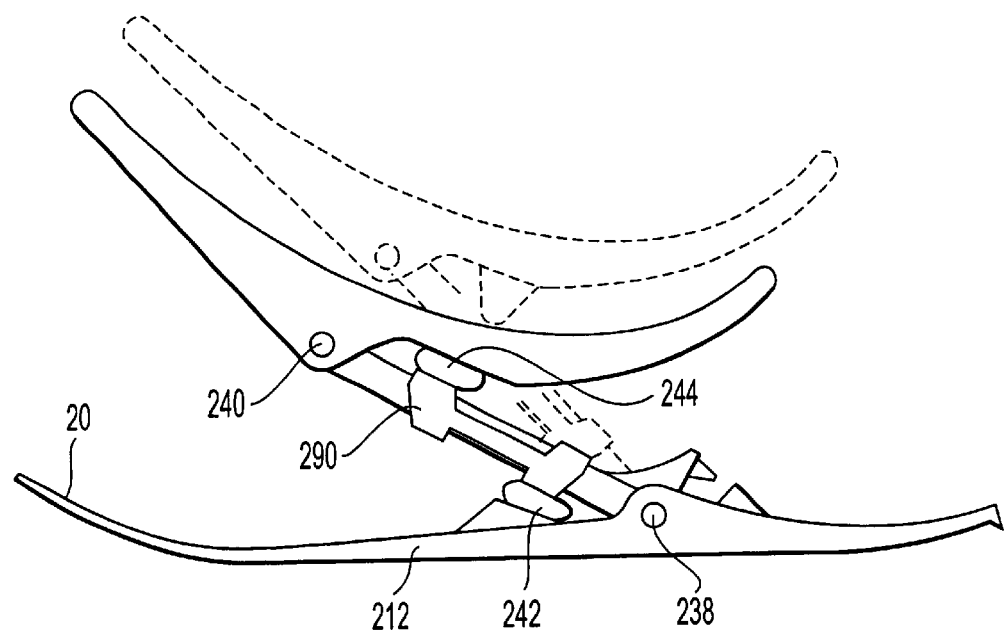
Figure 23:
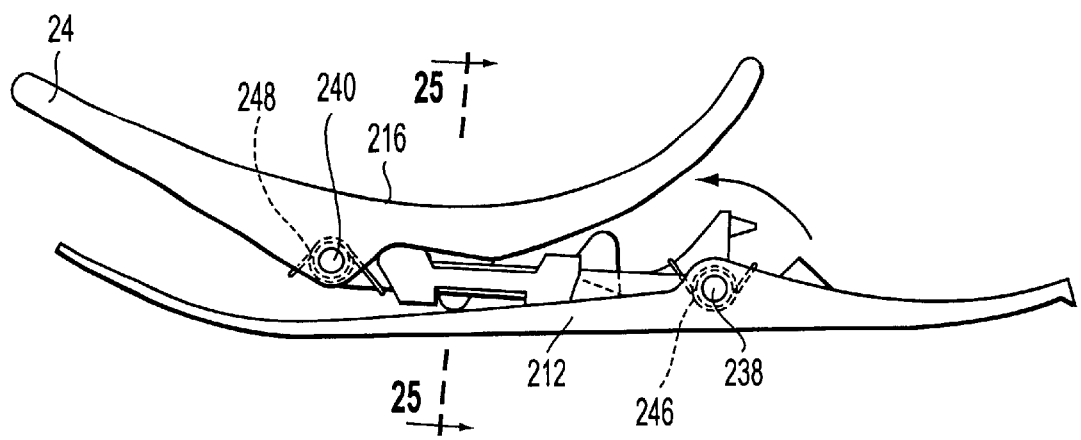
Figure 24:
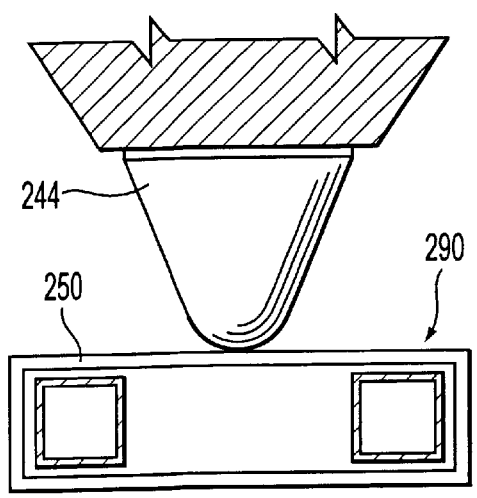
FIG. 24 is a cross sectional view according to line 24—24 of FIG. 21.
Figure 25:
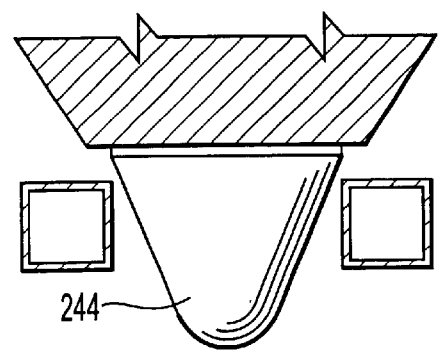
FIG. 25 is a cross sectional view according to line 25—25 of FIG. 23.

With reference to FIGS. 21 to 25, the seat 216 is connected with the pad 212 by means of a mechanical connection 290 with two articulation axis 238, 240. The spring shock absorbing member 58 of the device of FIGS. 7 and 8 is replaced by a system of elastic stops 242, 244 with progressive deformation and of conical forms. The lower stop 242 is arranged on the upper face of the pad 212 at the front of the articulation axis 238, whereas the upper stop 244 is arranged under the seat 216. A torsion spring 246, 248 is slipped around each axis 238, 240, and the leg of the mechanical connection 290 is inserted between the two stops 242, 244, which are deformed by compression when the seat 216 passes from the dotted line position towards the big line position (FIG. 22). In the active position of FIGS. 21 and 22, the stop 244 is arranged in front of a support plate 250 of mechanical connection 290. The support plate 250 is retracted in the inactive folded position (FIG. 23), in order to authorize the passage of the stop 244 (FIG. 25).

Figure 26:
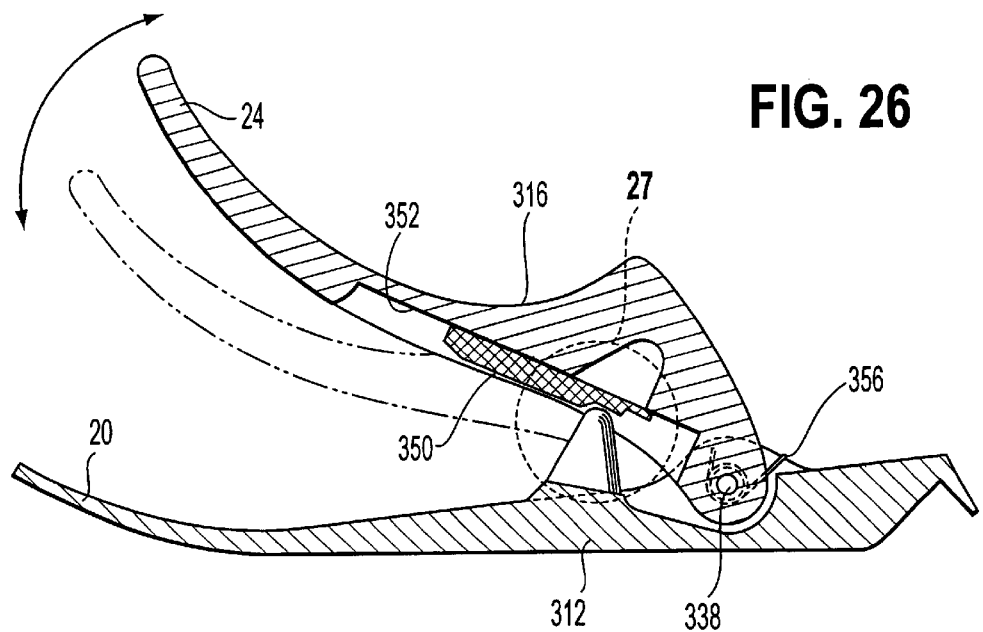
FIGS. 26 to 28 represent another embodiment of the suspension of a vehicle, respectively in a raised and a folded position, respectively.
Figure 27:
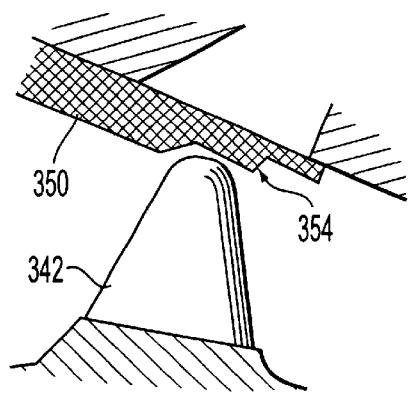
Figure 28:
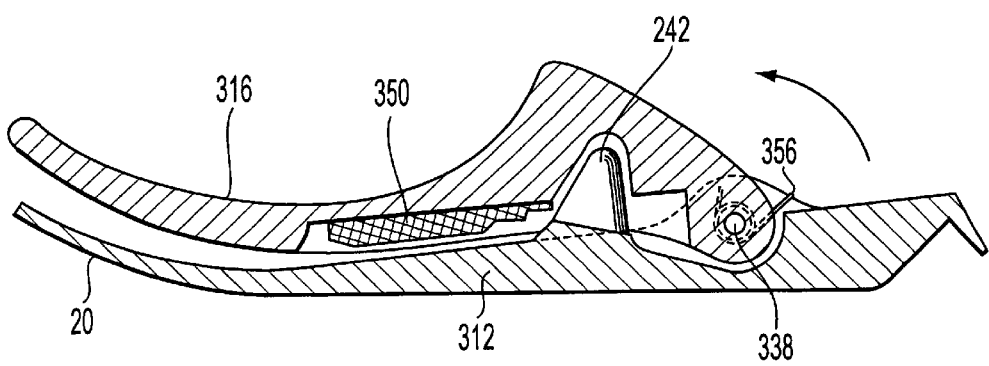

According to the embodiments of FIGS. 26 to 28, the seat 316 is articulated around a transverse axis 338 at the rear portion of pad 312, and the suspension is ensured by a conical stop 342 with progressive elasticity, fastened on the upper face of the pad 312. A support plate 350 is arranged in a longitudinal groove 352 under the lower face of the seat 316, and cooperates with the stop 342 during the suspension movement of seat 316. The support plate 350 comprises a terraced end 354 allowing, at the same time, the adjustment of the inclination of the seat 316 with regard to the pad 312 and the preconstraint of stop 342 in order to measure out the suspension. In the folded position of FIG. 28, the torsion spring 356 around the axis 338 keeps the seat 316 turned down against the pad 312.

The support element may be provided with a pair of straps (not represented) in order to make the transportation of the vehicle 10 in one's hand or on one's back easier.

What is claimed is:

1. Sliding vehicle for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element; and
   a shock absorbing member allowing relative rotation movement of the support element with respect to the sliding pad around a transverse axis extending perpendicularly to the symmetric plane of the vehicle, wherein the support element is connected with the pad by a mechanical connection allowing the support element to be turned down against the pad in a putting away and transportation position.

2. Sliding vehicle according to claim 1, wherein the mechanical connection can be disconnected at one of its ends.

3. Sliding vehicle according to claim 1, wherein the shock absorbing member comprises at least one of a spring, a combination of a spring and pneumatic shock absorber, a combination of a spring and hydraulic shocks absorber and an elastically deformable element.

4. A sliding vehicle according to claim 3, wherein the elastically deformable element is made of at least one of a rubber or an elastomer.

5. Sliding vehicle according to claim 1, further comprising a manual adjustment device for the stiffness of the shock absorbing member.

6. Sliding vehicle according to claim 1, further for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element;
   a shock absorbing member allowing relative rotation movement of the support element with respect to the sliding pad around a transverse axis extending perpendicularly to the symmetric plane of the vehicle; and
   means for maintaining the support element against the pad in a putting away and transportation position.

7. Sliding vehicle according to claim 1, further comprising a braking member arranged at a rear portion of the pad.

8. Sliding vehicle according to claim 1, wherein a footrest device is arranged in front of the mechanical connection and at a position lower than the seat, the footrest device being connected with an extension of the support element or with a raised tip of the pad.

9. Sliding vehicle according to claim 1, wherein the support element comprises at least one opening suitable for at least one of a gripping handle, and a transportation strap to make transportation of the vehicle easier.

10. Sliding vehicle according to claim 1, wherein the sliding pad has opposite longitudinal edges that are concave in the longitudinal vicinity of the seat.

11. Sliding vehicle according to claim 1, wherein said pad comprises at least two lateral support and sliding surfaces extending symmetrically on both sides of a central surface of said pad.

12. Sliding vehicle according to claim 1, wherein at least on one portion of the length of the pad, the sliding surface comprises at least two surfaces arranged symmetrically with respect to the vertical symmetric plan of the vehicle, in two cutting plans constituting a dihedral open at the top.

13. Sliding vehicle according to claim 1, wherein said support element is articulated on a connection leg protruding from said pad.

14. Sliding vehicle for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element; and
   a shock absorbing member allowing relative rotation movement of the support element with respect to the sliding pad around a transverse axis extending perpendicularly to the symmetric plane of the vehicle, wherein the shock absorbing member includes a torsion joint comprising a plurality of prestressed rubber blocks, arranged between four faces of a first square tube and four corners of a second square tube, the first square tube being arranged in a concentric manner inside the second square tube.

15. Sliding vehicle for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element;
   a shock absorbing member allowing relative rotation movement of the support element with respect to the sliding pad around a transverse axis extending perpendicularly to the symmetric plane of the vehicle; and
   a connection leg between the pad and the support element, wherein the transverse axis is arranged at one of the ends of a connection leg.

16. Sliding vehicle for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element; and
   a shock absorbing member allowing relative rotation movement of the support element with respect to the sliding pad around a transverse axis extending perpendicularly to the symmetric plane of the vehicle; and
   a connection leg between the pad and the support element, wherein the shock absorbing member is articulated between a median portion of the pad and a rear portion of the support element forming a "V" with the leg.

17. Sliding vehicle according to claim 16, further comprising a first rod connecting the support element and the pad and a second rod the second rod being between articulated the rear portion of the support element and the pad and extending parallel to the first.

18. Vehicle for snow sport, comprising:
   a sliding pad bearing on the snow;
   a support element arranged as a seat;
   a manual conducting member for steering and braking control of the vehicle, said member comprising a handle or handlebar, located in front of the seat, said member being rigidly connected with the support element; and a shock absorbing member allowing relative rotation movement of the support element with respect to the sliding pad around a transverse axis extending perpendicularly to the symmetric plane of the vehicle; and a mechanical connection with two articulation axes, the mechanical connection connecting the support element and the pad wherein the shock absorbing member comprises a system of elastic stops the elastic stops being progressively deformable and arranged on the upper face of the pad, and under the seat on each side of said mechanical connection.

19. Sliding vehicle for snow sport, comprising:

a sliding pad bearing on the snow;

a support element arranged as a seat;

a manual conducting member for steering and braking control of the vehicle, said member comprising a handle or handlebar, located in front of the seat, said member being rigidly connected with the support element; and a shock absorbing member allowing relative rotation movement of the support element with respect to the sliding pad around a transverse axis extending perpendicularly to the symmetric plane of the vehicle, wherein said shock absorbing member comprises a stop member of progressive elasticity, the stop member being fastened on the upper face of the pad so as to cooperate with a support plate located in a lower face of the seat, said plate being adjustable for an adjustment of an inclination of the seat and a preconstraint of the stop member.

20. Sliding vehicle for snow sport, comprising:

a sliding pad bearing on the snow;

a support element provided with a seat on which the driver sits down;

a shock absorbing member allowing a relative rotation movement around an axis of the support element with respect to the pad;

a manual conducting member for steering and braking control of the vehicle, said member being connected with the support element and formed at least by a handle or handlebar, located in front of the seat and in the sliding direction, wherein the support element is articulated with respect to the sliding pad around a transverse axis extending perpendicularly to the symmetric plane of the vehicle, wherein the seat is connected to the pad by means of a mechanical connection with two articulation axes and, wherein the shock absorbing member comprises a system of elastic stops, the elastic stops deformable and arranged on the upper surface of the pad and under the seat on each side of the mechanical connection.

21. Sliding vehicle for snow sport, comprising:

a sliding pad bearing on the snow;

a support element provided with a seat on which the driver sits down;

a shock absorbing member allowing a relative rotation movement around an axis of the support element with respect to the pad;

a manual conducting member for steering and braking control of the vehicle, said member being connected with the support element and formed at least by a handle or handlebar, located in front of the seat and in the sliding direction, wherein the support element is articulated with respect to the sliding pad around a transverse axis extending perpendicularly to the symmetric plane of the vehicle, wherein the seat is connected to the pad by means of a mechanical connection with two articulation axes and, wherein the seat is articulated around an axis, suspension is provided by a stop member of progressive elasticity, the stop member being fastened on the upper face of the pad so as to cooperate with a support plate located in a lower face of the seat, said plate being adjustable for the adjustment of an inclination of the seat and a preconstraint of the stop member.

* * * * *